US012626461B2

(12) United States Patent
Yoon et al.

(10) Patent No.: US 12,626,461 B2
(45) Date of Patent: May 12, 2026

(54) COMPLETE 3D OBJECT RECONSTRUCTION FROM AN INCOMPLETE IMAGE

(71) Applicant: Adobe Inc., San Jose, CA (US)

(72) Inventors: Jae Shin Yoon, San Jose, CA (US); Yangtuanfeng Wang, London (GB); Krishna Kumar Singh, San Jose, CA (US); Junying Wang, Los Angeles, CA (US); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 18/242,380

(22) Filed: Sep. 5, 2023

(65) Prior Publication Data

US 2025/0078406 A1 Mar. 6, 2025

(51) Int. Cl.
*G06T 17/10* (2006.01)
*G06T 5/77* (2024.01)
*G06T 7/70* (2017.01)

(52) U.S. Cl.
CPC ............... *G06T 17/10* (2013.01); *G06T 5/77* (2024.01); *G06T 7/70* (2017.01); *G06T 2200/24* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2016/0314619 A1* | 10/2016 | Luo | .......................... | G06T 7/344 |
| 2021/0383115 A1* | 12/2021 | Alon | ...................... | A63F 13/77 |
| 2022/0157017 A1* | 5/2022 | Du | ............................ | G06T 7/55 |
| 2023/0060131 A1* | 3/2023 | Wang | .................... | G06N 3/045 |
| 2023/0196617 A1* | 6/2023 | Zheng | ................. | G06V 10/811 |
| | | | | 382/159 |
| 2023/0306686 A1* | 9/2023 | Zangenehpour | ........ | G06T 17/20 |
| 2023/0334754 A1* | 10/2023 | Kirchmayer | ........... | G06T 17/00 |
| 2023/0377182 A1* | 11/2023 | Shin | ........................ | G01S 17/86 |

(Continued)

OTHER PUBLICATIONS

Albahar et al., Pose with Style: Detail-Preserving Pose-Guided Image Synthesis with Conditional StyleGAN, ACM Transactions on Graphics (TOG), vol. 40, No. 6, Article 218, Available online at: https://arxiv.org/pdf/2109.06166.pdf, Dec. 2021, pp. 218:1-218:11.

(Continued)

*Primary Examiner* — Andrew G Yang
(74) *Attorney, Agent, or Firm* — Kilpatrick Townsend & Stockton LLP

(57) ABSTRACT

A modeling system accesses a two-dimensional (2D) input image displayed via a user interface, the 2D input image depicting, at a first view, a first object. At least one region of the first object is not represented by pixel values of the 2D input image. The modeling system generates, by applying a 3D representation generation model to the 2D input image, a three-dimensional (3D) representation of the first object that depicts an entirety of the first object including the first region. The modeling system displays, via the user interface, the 3D representation, wherein the 3D representation is viewable via the user interface from a plurality of views including the first view.

20 Claims, 8 Drawing Sheets

(56) References Cited

U.S. PATENT DOCUMENTS

2024/0104828 A1*    3/2024    Wang ..................... G06T 15/20
2024/0144595 A1*    5/2024    Ponjou Tasse ......... G06V 10/82

OTHER PUBLICATIONS

Alldieck et al., Photorealistic Monocular 3D Reconstruction of Humans Wearing Clothing, in Proceedings of the IEEE/CVF Conference on Computer Vision and Pattern Recognition, Available online at: https://arxiv.org/pdf/2204.08906.pdf, Apr. 19, 2022, 14 pages.

Alldieck et al., Tex2Shape: Detailed Full Human Body Geometry from a Single Image, in Proceedings of the IEEE/CVF International Conference on Computer Vision, Available online at: https://arxiv.org/pdf/1904.08645.pdf, Sep. 15, 2019, 13 pages.

Cao et al., Realtime Multi-Person 2D Pose Estimation using Part Affinity Fields, IEEE Conference on Computer Vision and Pattern Recognition (CVPR), Available online at: https://arxiv.org/pdf/1611.08050.pdf, Apr. 14, 2017, 9 pages.

Chen et al., gDNA: Towards Generative Detailed Neural Avatars, in Proceedings of the IEEE/CVF Conference on Computer Vision and Pattern Recognition, Available online at: https://arxiv.org/pdf/2201.04123.pdf, Apr. 13, 2022, 11 pages.

Chen et al., Learning Implicit Fields for Generative Shape Modeling, in Proceedings of the IEEE/CVF Conference on Computer Vision and Pattern Recognition, Available online at: https://arxiv.org/pdf/1812.02822.pdf, Sep. 16, 2019, 10 pages.

Chen et al., Unpaired Pose Guided Human Image Generation, in Conference on Computer Vision and Pattern Recognition (CVPR 2019). Computer Vision Foundation (CVF), Available online at: https://arxiv.org/pdf/1901.02284.pdf, Jun. 4, 2019, 10 pages.

Choi et al., Learning to Estimate Robust 3D Human Mesh from In-the-Wild Crowded Scenes, in Proceedings of the IEEE/CVF Conference on Computer Vision and Pattern Recognition, Available online at: https://arxiv.org/pdf/2104.07300.pdf, Sep. 18, 2022, 16 pages.

Cicek et al., 3D U-Net: Learning Dense Volumetric Segmentation from Sparse Annotation, International Conference on Medical Image Computing and Computer-Assisted Intervention, Available online at: https://arxiv.org/pdf/1606.06650.pdf, Jun. 21, 2016, pp. 424-432.

Fan et al., A Point Set Generation Network for 3D Object Reconstruction from a Single Image, Computer Vision and Pattern Recognition, Available Online at: https://arxiv.org/abs/1612.00603, Dec. 7, 2016, 12 pages.

Goodfellow et al., Generative Adversarial Networks, Communications of the ACM, vol. 63, No. 11, Available online at: https://dl.acm.org/doi/pdf/10.1145/3422622, Nov. 2020, pp. 139-144.

Grigorev et al., StylePeople: a Generative Model of Fullbody Human Avatars, in Proceedings of the IEEE/CVF Conference on Computer Vision and Pattern Recognition, Available online at: https://arxiv.org/pdf/2104.08363.pdf, Apr. 16, 2021, 18 pages.

Groueix et al., A Papier-Mache Approach to Learning 3D Surface Generation, Cornell University, Computer Science; Computer Vision and Pattern Recognition, Available online at: https://arxiv.org/pdf/1802.05384.pdf, Jul. 20, 2018, 16 pages.

Guler et al., DensePose: Dense Human Pose Estimation in the Wild, in Proceedings of the IEEE Conference on Computer Vision and Pattern Recognition, Available online at: https://arxiv.org/pdf/1802.00434.pdf, Feb. 1, 2018, 12 pages.

He et al., ARCH++: Animation-Ready Clothed Human Reconstruction Revisited, in Proceedings of the IEEE/CVF International Conference on Computer Vision, Available online at: https://arxiv.org/pdf/2108.07845.pdf, Aug. 17, 2021, 18 pages.

He et al., Geo-PIFu: Geometry and Pixel Aligned Implicit Functions for Single-view Human Reconstruction, Advances in Neural Information Processing Systems, vol. 33, Available online at: https://arxiv.org/pdf/2006.08072.pdf, Dec. 7, 2020, 14 pages.

Ho et al., Denoising Diffusion Probabilistic Models, Advances in Neural Information Processing Systems, vol. 33, Available online at: https://arxiv.org/pdf/2006.11239.pdf, Dec. 16, 2020, 25 pages.

Hong et al., StereoPIFu: Depth Aware Clothed Human Digitization via Stereo Vision, in Proceedings of the IEEE/CVF Conference on Computer Vision and Pattern Recognition, Available online at: https://openaccess.thecvf.com/content/CVPR2021/papers/Hong_StereoPIFu_Depth_Aware_Clothed_Human_Digitization_via_Stereo_Vision_CVPR_2021_paper.pdf, Apr. 12, 2021, pp. 535-545.

Huang et al., ARCH: Animatable Reconstruction of Clothed Humans, in Proceedings of the IEEE/CVF Conference on Computer Vision and Pattern Recognition, Available online at: https://arxiv.org/pdf/2004.04572.pdf, Apr. 10, 2020, 10 pages.

Isola et al., Image-to-Image Translation with Conditional Adversarial Networks, in Proceedings of the IEEE Conference on Computer Vision and Pattern Recognition, Available Online at: http://gangw.cs.illinois.edu/class/cs598/papers/CVPR17-img2img.pdf, Nov. 26, 2018, pp. 1125-1134.

Jackson et al., 3D Human Body Reconstruction from a Single Image via Volumetric Regression, in Proceedings of the European Conference on Computer Vision (ECCV) Workshops, Available online at: https://openaccess.thecvf.com/content_ECCVW_2018/papers/11132/Jackson_3D_Human_Body_Reconstruction_from_a_Single_Image_via_Volumetric_ECCVW_2018_paper.pdf, Sep. 11, 2018, 14 pages.

Johnson et al., Perceptual Losses for Real-Time Style Transfer and Super-Resolution, in European Conference on Computer Vision, Available Online at: https://arxiv.org/pdf/1603.08155.pdf%7C, Mar. 27, 2016, 18 pages.

Kanazawa et al., End-to-end Recovery of Human Shape and Pose, Computer Vision and Pattern Recognition (CVPR), Available online at: https://arxiv.org/pdf/1712.06584.pdf, Jun. 23, 2018, 10 pages.

Kolotouros et al., Convolutional Mesh Regression for Single-Image Human Shape Reconstruction, in Proceedings of the IEEE/CVF Conference on Computer Vision and Pattern Recognition, Available online at: https://arxiv.org/pdf/1905.03244.pdf, May 8, 2019, 10 pages.

Kolotouros et al., Learning to Reconstruct 3D Human Pose and Shape via Model-Fitting in the Loop, in Proceedings of the IEEE International Conference on Computer Vision, Sep. 27, 2019, 10 pages.

Lassner et al., A Generative Model of People in Clothing, in Proceedings of the IEEE International Conference on Computer Vision, Available online at: https://arxiv.org/pdf/1705.04098.pdf, Jul. 31, 2017, 10 pages.

Lin et al., Learning Efficient Point Cloud Generation for Dense 3D Object Reconstruction, in proceedings of the AAAI Conference on Artificial Intelligence, vol. 32, Available online at: https://arxiv.org/pdf/1706.07036.pdf, Jun. 21, 2017, 10 pages.

Liu et al., DIST: Rendering Deep Implicit Signed Distance Function with Differentiable Sphere Tracing, in Proceedings of the IEEE/CVF Conference on Computer Vision and Pattern Recognition, Available online at: https://arxiv.org/pdf/1911.13225.pdf, Jun. 11, 2020, 20 pages.

Loper et al., SMPL: a Skinned Multi-person Linear Model, ACM Transactions on Graphics, vol. 34, No. 6, Nov. 2, 2015, pp. 1-16.

Lorensen et al., Marching Cubes: a High-Resolution 3D Surface Construction Algorithm, ACM Siggraph Computer Graphics, vol. 21, No. 4, Jul. 1, 1987, pp. 163-169.

Ma et al., Pose Guided Person Image Generation, Advances in Neural Information Processing Systems, vol. 30, Available online at: https://arxiv.org/pdf/1705.09368.pdf, Jan. 28, 2018, 11 pages.

Mescheder et al., Occupancy Networks: Learning 3D Reconstruction in Function Space, Cornell University, Computer Science; Computer Vision and Pattern Recognition, Apr. 30, 2019, 11 pages.

Newell et al., Stacked Hourglass Networks for Human Pose Estimation, European conference on computer vision, Available Online at: https://arxiv.org/pdf/1603.06937.pdf, Jul. 26, 2016, 17 pages.

Nguyen-Phuoc et al., HoloGAN: Unsupervised Learning of 3D Representations from Natural Images, in Proceedings of the IEEE/CVF International Conference on Computer Vision, Available online at: https://arxiv.org/pdf/1904.01326.pdf, Oct. 1, 2019, 10 pages.

US 12,626,461 B2

Page 3

(56) References Cited

OTHER PUBLICATIONS

Park et al., DeepSDF: Learning Continuous Signed Distance Functions for Shape Representation, Proceedings of the IEEE/CVF Conference on Computer Vision and Pattern Recognition, Jan. 16, 2019, 19 pages.

Pavlakos et al., Expressive Body Capture: 3D Hands, Face, and Body from a Single Image, in Proceedings IEEE Conference on Computer Vision and Pattern Recognition (CVPR), Apr. 11, 2019, 22 pages.

Pavlakos et al., Learning to Estimate 3D Human Pose and Shape from a Single Color Image, in Proceedings of the IEEE Conference on Computer Vision and Pattern Recognition, Available online at: https://arxiv.org/pdf/1805.04092.pdf, May 10, 2018, 10 pages.

Pavlakos et al., TexturePose: Supervising Human Mesh Estimation with Texture Consistency, in Proceedings of the IEEE/CVF International Conference on Computer Vision, Available online at: https://arxiv.org/pdf/1910.11322.pdf, Oct. 24, 2019, 10 pages.

Qi et al., PointNet: Deep Learning on Point Sets for 3D Classification and Segmentation, in The IEEE Conference on Computer Vision and Pattern Recognition (CVPR), Apr. 10, 2017, 19 pages.

Qi et al., PointNet++: Deep Hierarchical Feature Learning on Point Sets in a Metric Space, 31st Conference on Neural Information Processing Systems, Jun. 7, 2017, 14 pages.

Saito et al., PIFu: Pixel-Aligned Implicit Function for High-Resolution Clothed Human Digitization, in Proceedings of the IEEE/CVF International Conference on Computer Vision, Dec. 3, 2019, pp. 2304-2314.

Saito et al., PIFuHD: Multi-Level Pixel-Aligned Implicit Function for High-Resolution 3D Human Digitization, in Proceedings of the IEEE/CVF Conference on Computer Vision and Pattern Recognition, Available online at: https://arxiv.org/pdf/2004.00452.pdf, Apr. 1, 2020, 10 pages.

Sarkar et al., HumanGAN: a Generative Model of Humans Images, in 2021 International Conference on 3D Vision (3DV), Available online at: https://arxiv.org/pdf/2103.06902.pdf, Mar. 11, 2021, 21 pages.

Schwarz et al., GRAF: Generative Radiance Fields for 3D-Aware Image Synthesis, Advances in Neural Information Processing Systems, Available online at: https://arxiv.org/abs/2007.02442, Mar. 30, 2021, pp. 1-13.

Sohl-Dickstein et al., Deep Unsupervised Learning using Nonequilibrium Thermodynamics, in International Conference on Machine Learning, Available online at: https://arxiv.org/pdf/1503.03585.pdf, Nov. 18, 2015, 18 pages.

Torosdagli et al., Deep Geodesic Learning for Segmentation and Anatomical Landmarking, IEEE Transactions on Medical Imaging, vol. 38, No. 4, Apr. 2019, 39 pages.

Varol et al., BodyNet: Volumetric Inference of 3D Human Body Shapes, in Proceedings of the European Conference on Computer Vision (ECCV), Available online at: https://arxiv.org/pdf/1804.04875.pdf, Aug. 18, 2018, 27 pages.

Wang et al., Pixel2Mesh: Generating 3D Mesh Models from Single RGB Images, in Proceedings of the European Conference on Computer Vision (ECCV), Available online at: https://arxiv.org/pdf/1804.01654.pdf, Aug. 3, 2018, 16 pages.

Wu et al., Learning a Probabilistic Latent Space of Object Shapes via 3D Generative-Adversarial Modeling, 29th Conference on Neural Information Processing Systems (NIPS 2016), Barcelona, Spain, Jan. 4, 2017, 11 pages.

Xiu et al., ICON: Implicit Clothed humans Obtained from Normals, in Proceedings of the IEEE/CVF Conference on Computer Vision and Pattern Recognition, Available online at: https://arxiv.org/pdf/2112.09127.pdf, Mar. 28, 2022, 22 pages.

Yang, PointFlow: 3D Point Cloud Generation with Continuous Normalizing Flows, in Proceedings of the IEEE/CVF International Conference on Computer Vision, Available online at: https://arxiv.org/pdf/1906.12320.pdf, Sep. 2, 2019, 15 pages.

Yoon et al., Pose-Guided Human Animation from a Single Image in the Wild, in Proceedings of the IEEE/CVF Conference on Computer Vision and Pattern Recognition, Available online at: https://arxiv.org/pdf/2012.03796.pdf, Nov. 22, 2021, 14 pages.

Yu et al., Function4D: Real-time Human Volumetric Capture from Very Sparse Consumer RGBD Sensors, in IEEE Conference on Computer Vision and Pattern Recognition (CVPR2021), Available online at: https://arxiv.org/pdf/2105.01859.pdf, May 6, 2021, 11 pages.

Zhang et al., PyMAF: 3D Human Pose and Shape Regression with Pyramidal Mesh Alignment Feedback Loop, in Proceedings of the IEEE/CVF International Conference on Computer Vision, Apr. 1, 2021, pp. 11446-11456.

Zhang et al., PyMAF-X: Towards Well-aligned Full-body Model Regression from Monocular Images, IEEE Transactions on Pattern Analysis and Machine Intelligence, vol. 45, No. 10, Available online at: http://export.arxiv.org/pdf/2207.06400, Apr. 28, 2023, 21 pages.

Zheng et al., DeepHuman: 3D Human Reconstruction from a Single Image, in the IEEE International Conference on Computer Vision (ICCV), Available online at: https://arxiv.org/pdf/1903.06473.pdf, Mar. 28, 2019, 14 pages.

Zheng et al., DeepMultiCap: Performance Capture of Multiple Characters Using Sparse Multiview Cameras, in IEEE Conference on Computer Vision (ICCV 2021), Available online at: http://export.arxiv.org/pdf/2105.00261, Aug. 28, 2021, 11 pages.

Zheng et al., PaMIR: Parametric Model-Conditioned Implicit Representation for Image-Based Human Reconstruction, IEEE Transactions on Pattern Analysis and Machine Intelligence, vol. 44, No. 6, Available online at: https://arxiv.org/pdf/2007.03858v1.pdf, Jul. 8, 2020, 15 pages.

* cited by examiner

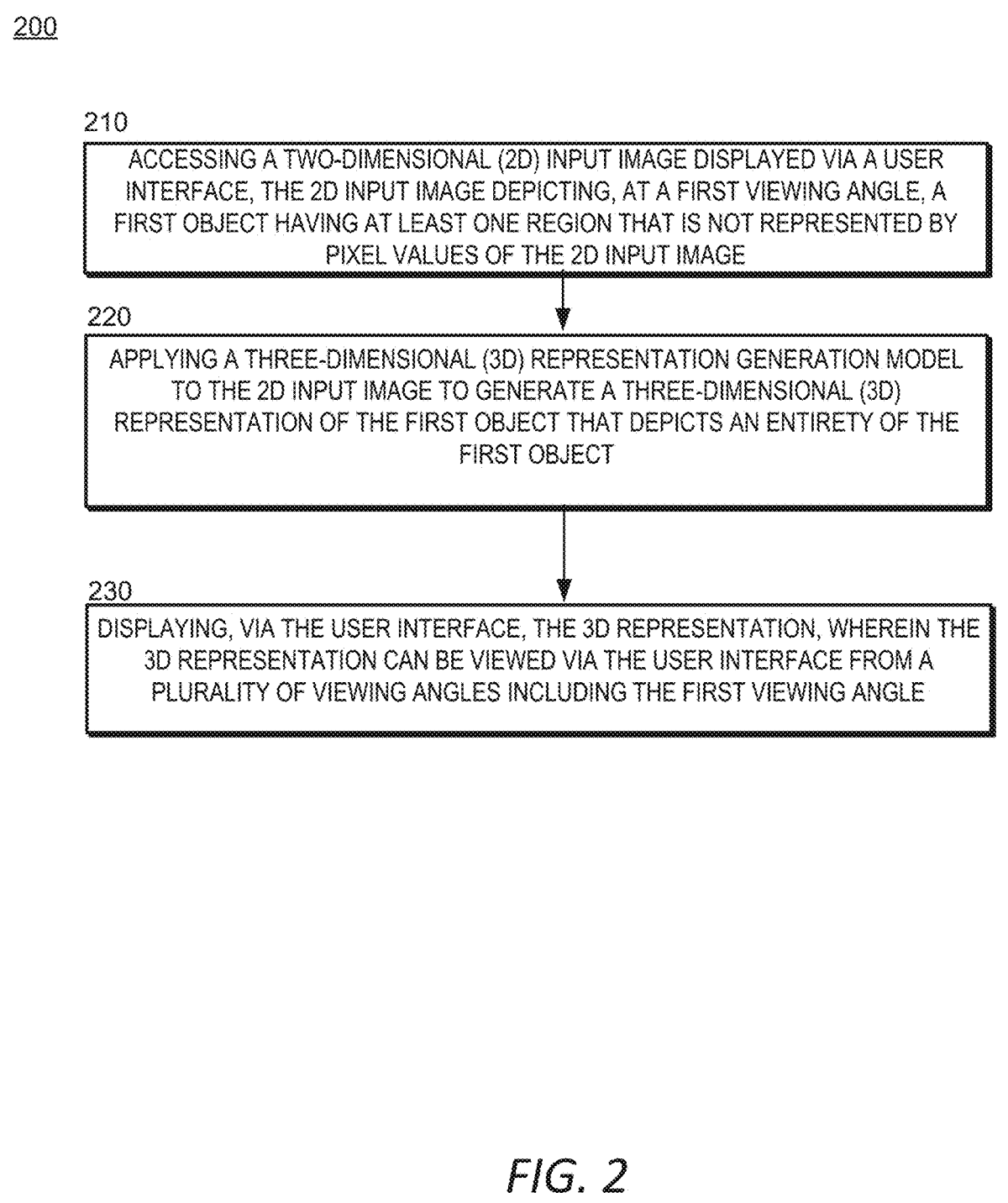

200

210

ACCESSING A TWO-DIMENSIONAL (2D) INPUT IMAGE DISPLAYED VIA A USER INTERFACE, THE 2D INPUT IMAGE DEPICTING, AT A FIRST VIEWING ANGLE, A FIRST OBJECT HAVING AT LEAST ONE REGION THAT IS NOT REPRESENTED BY PIXEL VALUES OF THE 2D INPUT IMAGE

220

APPLYING A THREE-DIMENSIONAL (3D) REPRESENTATION GENERATION MODEL TO THE 2D INPUT IMAGE TO GENERATE A THREE-DIMENSIONAL (3D) REPRESENTATION OF THE FIRST OBJECT THAT DEPICTS AN ENTIRETY OF THE FIRST OBJECT

230

DISPLAYING, VIA THE USER INTERFACE, THE 3D REPRESENTATION, WHEREIN THE 3D REPRESENTATION CAN BE VIEWED VIA THE USER INTERFACE FROM A PLURALITY OF VIEWING ANGLES INCLUDING THE FIRST VIEWING ANGLE

*FIG. 2*

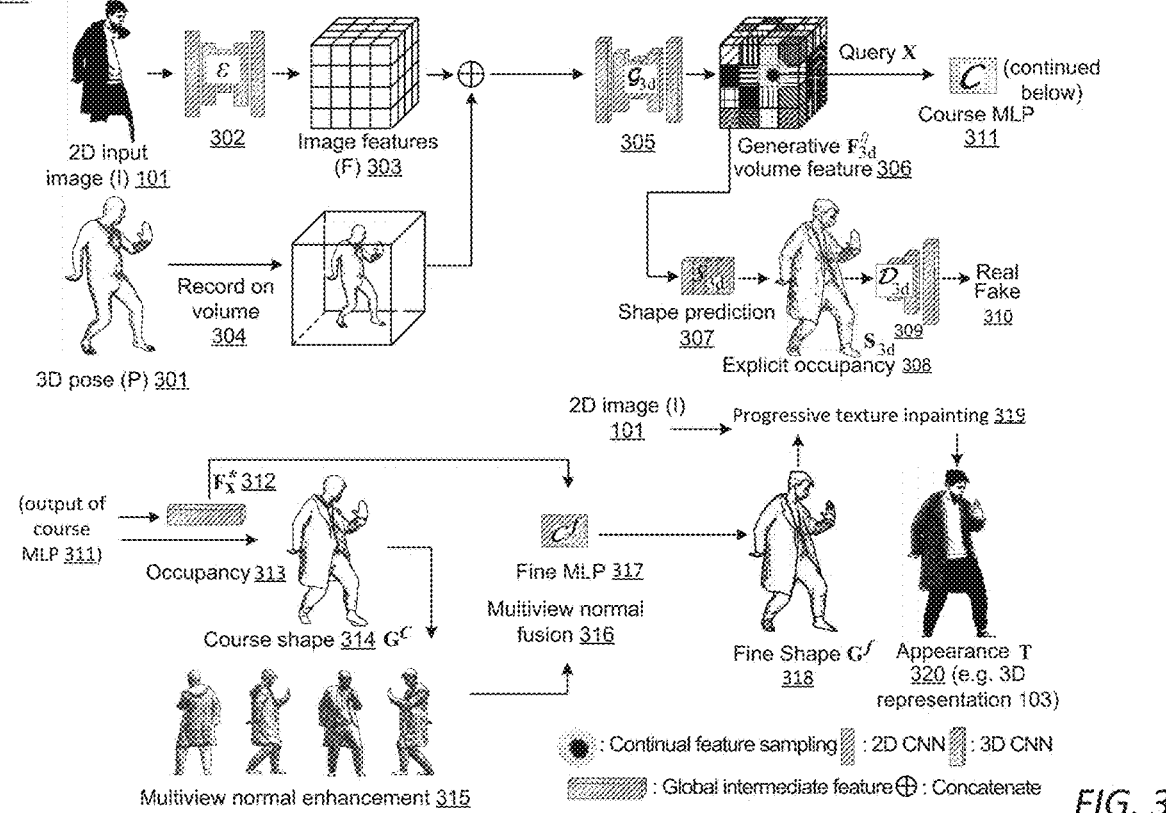

115

2D input image (I) 101

302

Image features (F) 303

305

Generative $F_{3d}^g$ volume feature 306

Query X $C$ (continued below)

Course MLP 311

3D pose (P) 301

Record on volume 304

Shape prediction 307

$S_{3d}$ 309

Explicit occupancy 308

$D_{3d}$

Real Fake 310

2D image (I) 101

Progressive texture inpainting 319

(output of course MLP 311)

$F_X^g$ 312

Occupancy 313

Course shape 314 $G^c$

Fine MLP 317

Multiview normal fusion 316

Fine Shape $G^f$ 318

Appearance T 320 (e.g. 3D representation 103)

Multiview normal enhancement 315

●: Continual feature sampling    ▊: 2D CNN    ▊: 3D CNN

▨: Global intermediate feature    ⊕: Concatenate

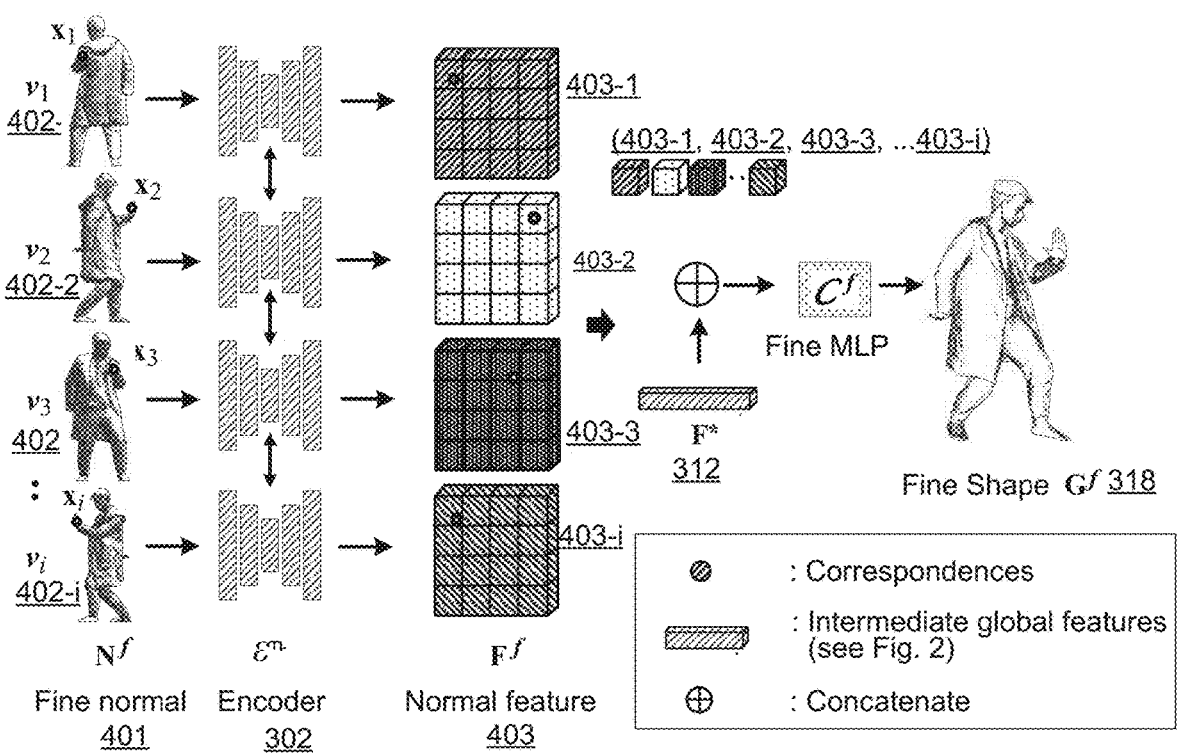

$N^f$
Fine normal
<u>401</u>

$\mathcal{E}^n$
Encoder
<u>302</u>

$F^f$
Normal feature
<u>403</u>

<u>403-1</u>

(<u>403-1</u>, <u>403-2</u>, <u>403-3</u>, ...<u>403-i</u>)

<u>403-2</u>

Fine MLP $C^f$

<u>403-3</u>     $F^a$
<u>312</u>

<u>403-i</u>

Fine Shape  $G^f$ <u>318</u>

⊘     : Correspondences

▨     : Intermediate global features
        (see Fig. 2)

⊕     : Concatenate

Input I
<u>101</u>

SMPL $N^p$
<u>401</u>

Coarse $N^c$
<u>402</u>

<u>404</u>

Fine $N^f$ <u>405</u>

<u>403</u>

<u>406</u>

Real/
fake
<u>407</u>

Input i
<u>101</u>

⊕ : Concatenate    ⌐ ⌐: Black for other views other than
                    input view

*FIG. 5*

3D representation 103 (appearance 320)

Input
(2D input
image 101)

Prediction
(Fine shape
318)

Front
602-1

Right
602-2

Left
602-3

Back
602-4

701-1

702-1

703-1

704-1

705-1

706-1

701-2

702-2

703-2

704-2

705-2

706-2

701-3

702-3

703-3

704-3

705-3

706-3

701-4

702-4

703-4

704-4

705-4

706-4

Input image
701
(e.g. 101)

Ground truth
702

3D representation
generation model 115

ICON 704

PIFuHD 705

PIFu 706

COMPLETE 3D OBJECT RECONSTRUCTION FROM AN INCOMPLETE IMAGE

TECHNICAL FIELD

This disclosure generally relates to techniques for using machine learning models to generate a three-dimensional (3D) representation of an object from a two-dimensional (2D) image of the object. More specifically, but not by way of limitation, this disclosure relates to generating a 3D representation of an object from an incomplete 2D image of the object.

BACKGROUND

Conventional scene generation systems can generate a full 3D representation (e.g., e.g., a 3D model) of an object (e.g., e.g., a human person, an animal, or other object) from a 2D image of the object. Conventional approaches can use neural networks to learn image features at each pixel (e.g., pixel aligned features) of the 2D image, which enable continual classification of a position in 3D along a camera ray, to generate 3D representations with high-quality local details.

SUMMARY

The present disclosure describes techniques for applying a 3D representation generation model to an 2D input image of an object to generate a 3D model of the object. A modeling system accesses a two-dimensional (2D) input image displayed via a user interface, the 2D input image depicting, at a first view, a first object. At least one region of the first object is not represented by pixel values of the 2D input image. The modeling system generates, by applying a 3D representation generation model to the 2D input image, a three-dimensional (3D) representation of the first object that depicts an entirety of the first object including the first region. The modeling system displays, via the user interface, the 3D representation, wherein the 3D representation is viewable via the user interface from a plurality of views including the first view.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts a method for using a 3D representation generation model to generate a 3D representation of an object from an 2D input image of incompletely-depicted object, according to certain embodiments disclosed herein.

FIG. 3 depicts a 3D representation generation model, according to certain embodiments disclosed herein.

FIG. 4 depicts a multiview normal surface fusion pipeline of the 3D representation generation model of FIG. 3, according to certain embodiments described herein.

FIG. 5 depicts a multiview normal enhancement framework of the 3D representation generation model of FIG. 3, according to certain embodiments described herein.

DETAILED DESCRIPTION

Figure 1:
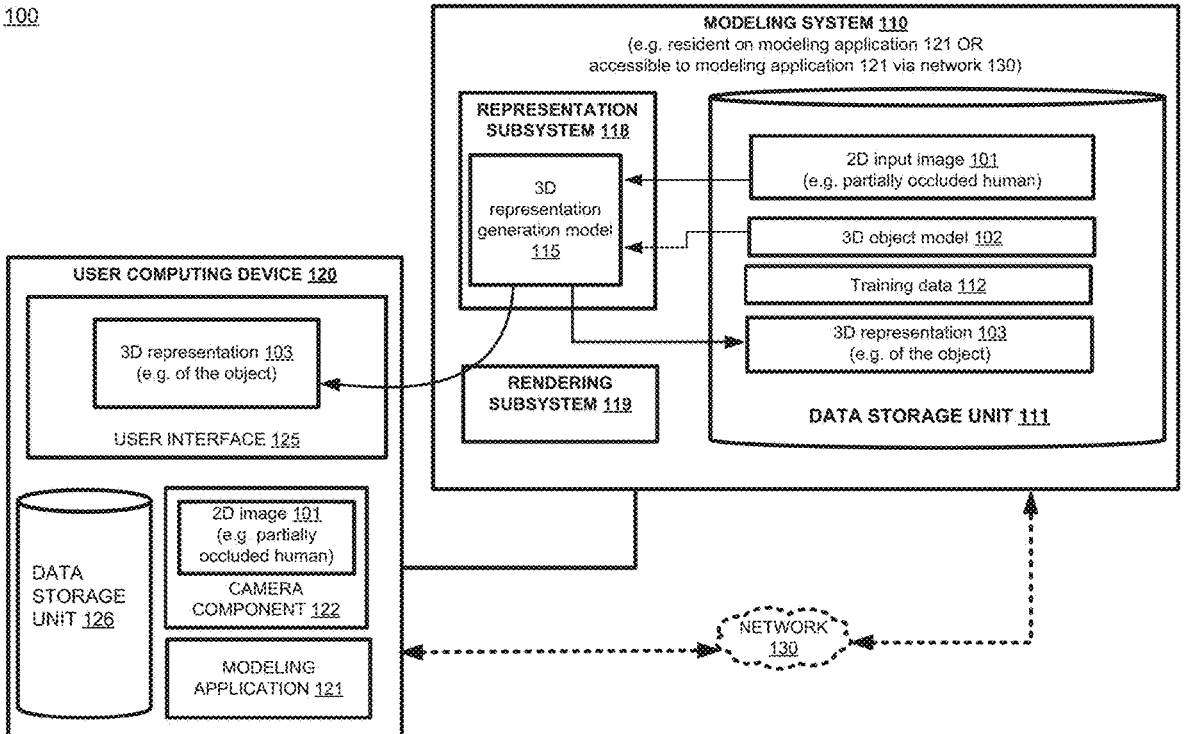
FIG. 1 depicts an example of a computing environment for using a 3D reconstruction generation model to generate a 3D representation of an object from an 2D input image of incompletely-depicted object, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional modeling systems can generate a full 3D representation (e.g., 3D model) of an object (e.g., a human person, an animal, or other object) from a 2D image of the object. Conventional approaches can use neural networks to learn image features at each pixel (e.g., pixel aligned features) of the 2D image, which enable continual classification of a position in a 3D space along a camera ray, to generate 3D representations with high-quality local details. However, such conventional approaches for generating 3D representations predicts features for the 3D representation only for pixels of the object captured by the camera. In other words, in conventional approaches, 3D representation generation does not consider pixels including invisible parts of an object. For example, in an image depicting person, where the person is visible in a camera view except for a right arm of the person that is occluded (e.g., by another object, such as another person standing in front of the person), the 3D representation of the person generated from this image in a conventional manner is not able to consider any pixel values representing the occluded right arm. Accordingly, local details in the missing part (e.g., the missing arm) of the object may be missing or unnaturally shaped. Further, in the conventional approaches for generating a 3D representation of an object from a 2D image, an ordinal (e.g., front to back) relationship of reconstructed 3D points is not globally coherent. In other words, reconstruction of one area (e.g., a face) of the object may be locally plausible but be distorted in combination with other areas (e.g., a torso) of the object. Accordingly, in these conventional approaches, the 3D representation of an object generated from the 2D image of the object, where the object is at least partially occluded in the 2D image, is not complete and/or not globally coherent. Also existing methods consider surface normal maps using surface normal detection from an image. However, conventional surface normal maps misses object pars where no pixel exists to detect the object part and provides only a single-view input and therefore surface normals from other views is unknown, which prevents reconstruction of the invisible parts of the image.

Certain embodiments described herein address the limitations of conventionally generated 3D representations by using a 3D convolutional neural network to capture a global ordinal relation of an object (e.g., a human body) in a canonical 3D volume space and generate volumetric features by encoding an incomplete 2D image (e.g., depicting a partially occluded object) and a 3D object model. The 3D object model provides a unified guidance of a pose in the coherent 3D space. Such volumetric features, in the embodiments described herein, are jointly learned with a 3D discriminator in a way that generates a coarse yet complete 3D geometry for the 3D representation, unlike the conventional approach which does not generate a complete geometry from an incomplete 2D image. Because the embodiments describe herein generate a complete 3D representation geometry, a coherent rendering of shape over a plurality of viewpoints is enabled, enabling enhancement of surface normals and inpainting of textures in a multiview-consistent way that is not possible in the conventional approaches. Specifically, the reconstruction network described herein includes a normal fusion network that combines fine surface normals from multiviews with learned volumetric features that increases the quality of local geometry details over conventionally generated 3D representations.

The following non-limiting example is provided to introduce certain embodiments. In this example, a modeling system accesses a 2D input image displayed via a user interface, the 2D input image depicting, at a first viewing angle, a first object having at least one surface region that is not represented by pixel values of the 2D input image. In an example, a user captures the image using a user computing device. In this example, the user accesses a modeling application, selects the 2D input image, and the 2D input image, which depicts a first object, is displayed on the user interface of the user computing device. The 2D image is an incomplete image in that it does not include pixel values representing an entirety of a depicted first object. For example, the incomplete image depicts the first object that has a surface that is at least partially occluded by one or more other objects. In another example, in the incomplete 2D input image, part of the surface of the first object is outside of the field of view of the camera.

The modeling system applies a 3D representation generation model to the 2D input image to generate a 3D representation of the first object that represents an entirety of the surface of the first object including the at least one surface region. The modeling system displays the 3D representation via the user interface, wherein the 3D representation can be viewed via the user interface from a plurality of viewing angles including the first viewing angle. For example, responsive to receiving the request to generate a 3D representation from the 2D input image, the modeling system displays the 3D representation via the user interface. Continuing with the example of generating the 3D representation of the second person in the image of the two people, the image editing system displays the 3D representation of the second person. In this example, the modeling system can change a viewing angle of the 3D representation displayed via the user interface responsive to receiving an input via the user interface. For example, modeling system can display, via the user interface, a front view, a back view a left side view, a right side view, and/or other viewing angles of the 3D representation responsive to receiving a selection of one or more user interface objects.

The embodiments described herein, specifically generating a 3D representation of an object by applying a 3D representation generation model to a 2D image that incompletely depicts the object, significantly improves an accuracy of the 3D representation over conventionally generated 3D representations. As previously discussed, conventionally generated 3D representations of an object may not be accurate in scenarios in which the 2D input image incompletely depicts the object because the conventional image segmentation processes do not consider missing information of the object not depicted in pixels of the 2D image when generating the 3D model. The embodiments described herein address these deficiencies of the conventional 3D representation generation processes by incorporating a 3D representation generation model that captures a global ordinal relation of an object in a canonical 3D volume space and generates volumetric features by encoding the incomplete 2D image and a 3D object model to provide a unified guidance of a pose in the coherent 3D space. Such volumetric features, in the embodiments described herein, are jointly learned with a 3D discriminator in a way that generates a coarse yet complete 3D geometry for the 3D representation, which are superior to conventionally generated 3D representations that do not consider regions of an object not represented by pixel values of the 2D input image.

Example Operating Environment for Using a 3D Representation Generation Model to Generate a 3D Representation of an Object from an 2D Input Image of Incompletely-Depicted Object Referring now to the drawings, FIG. 1 depicts an example of a computing environment 100 for using 3D representation generation model 117 to generate, based on a 2D input image 101 that incompletely depicts a surface of an object, a 3D representation 103 of the object, according to certain embodiments disclosed herein. The computing environment 100 includes, as depicted in FIG. 1, a modeling system 110, which can include one or more processing devices that execute a representation subsystem 118 and a rendering subsystem 119. In certain embodiments, the modeling system 110 is a component of a user computing device 120 and operates on the user computing device 120. In certain embodiments, as also depicted in FIG. 1, the modeling system 110, including the representation subsystem 118 and the rendering subsystem 119, and the data storage unit 111, is a network server or other computing device that is accessible to the user computing device 120 and communicates with the user computing device 120 via a network 130.

The modeling system 110 includes a representation subsystem 118 that includes a 3D representation generation model 115. The 3D representation generation model 115 generates a 3D representation 103 of an object by applying the 3D representation generation model 115 to the 2D input image 101. The 3D representation 103 can be viewed from a plurality of viewing angles. For example, viewing angles can include a front view, a side view, a back view, or other views of the 3D representation 103 of the object. In some instances, the representation subsystem 118 stores the generated 3D representation 103 in the data storage unit 111. Further details about the 3D representation generation model 115 are described in FIG. 3, FIG. 4, and FIG. 5.

In certain embodiments, the rendering subsystem 119 displays the generated 3D representation 103 of the object via a user interface 125 of a user computing device 120. In some instances, the rendering subsystem 119 changes, responsive to receiving a user interface 125 input a viewing angle of the generated 3D representation 103. For example, the rendering subsystem 119 can display, via the user interface 125, the generated 3D representation 103 from a frontal view, a rear view, one or more side views, or other views of the 3D representation 103.

The modeling system 110 includes a data storage unit 111. An example data storage unit 111 is accessible to the modeling system 110 and stores data for the modeling system 110. In some instances, the data storage unit 111 stores a set of training data 112 for use in training the 3D representation generation model 115. In some instances, the data storage unit 111 stores one or more 2D input images 101. In some instances, the data storage unit 111 stores one or more 3D object models 102. In some instances, the data storage unit 111 stores one or more 3D representations 103 generated by the representation subsystem 118.

An example user computing device 120 includes a modeling application 121, a camera component 122, a user interface 125, and a data storage unit 126. In certain embodiments, the user computing device 120 is a smart phone device, a personal computer (PC), a tablet device, or other user computing device 120. In some embodiments, the user computing device 120, as depicted in FIG. 1, includes the modeling system 110. For example, the representation subsystem 118 and the rendering subsystem 119 are components of the modeling application 121 and the data storage unit 126 performs functions described herein as being performed by the data storage unit 111. However, in other embodiments, as also depicted in FIG. 1, the user computing device 120 is a separate system from the modeling system 110 and communicates with the modeling system 110 via the network 130.

The modeling application 121, in some embodiments, is associated with a 3D modeling service and the user downloads the modeling application 121 on the user computing device 120. For example, the user accesses an application store or a website of a 3D modeling service using the user computing device 120 and requests to download the modeling application 121 on the user computing device 120. The modeling application 121 operates on the user computing device 120 and enables a user of the user computing device 120 to generate 3D representations 103 of an object from an 2D input image 101 that includes pixel data of an incomplete depiction of the object. The modeling application 121 enables the user to interact, via the user interface 125 with the modeling application 121. The modeling application 121 can communicate with the user interface 125 to receive one or more inputs from the user. The modeling application 121 can instruct the user interface 125 to display the 2D input image 101 and a 3D representation 103 generated based on the 2D input image 101. In some embodiments, the modeling application 121 communicates with one or more of the representation subsystem 118 and the rendering subsystem 119 of the image editing system 110.

In certain embodiments, the modeling application 121 includes the representation subsystem 118 and the rendering subsystem 119 and performs the operations described herein as being performed by the subsystems 118 and 119. For example, in certain embodiments, the modeling application 121 of the user computing device 120 can generate 3D representations 103 of an object from an 2D input image 101 that includes pixel data of an incomplete depiction of the object. For example, the pixel data is incomplete because pixels in a region of the input 2D input image 101 correspond to another object that occludes the object in the region. In another example, the pixel data is incomplete because a region of the object is outside of the camera field of view depicted in the 2D input image 101 therefore the 2D input image 101 does not include pixel data describing the region.

In certain embodiments the camera component 122 is a camera module or camera device component of the user computing device 120 that is able to capture images and/or video of an environment of the camera component 122. In some embodiments, the camera component 122 is a separate device from the user computing device 120 and is communicatively coupled to the user computing device 120. The camera component 122 communicates with the modeling application 121 and transmits, to the modeling application 121, an 2D input image 101 captured by the camera component 122. For example, the 2D input image 101 is of an environment of the user computing device camera component 122. For example, the environment includes an object for which the user desires to generate a 3D representation 103. In some instances, however, the 2D input image 101 is not captured by the camera component 122.

The data storage unit 124 is accessible to the user computing device 120 and stores data for the user computing device 120. In some instances, the data storage unit 126 stores a 2D input image 101. In some instances, the data storage unit 126 stores a 3D object model 102 that the representation subsystem 118 uses, with the 2D input image 101, to generate the 3D representation 103.

The user interface 123 can include a touchscreen display interface, a display device (e.g., a monitor) with a separate input device (e.g., a mouse), or other user interface 123 which can receive one or more inputs from the user and display information or provide other output to the user. For example, the user interface 123 can display a 2D input image 101. In some instances, the user interface 123 displays a 3D representation 103 of an object depicted in the 2D input image 101 that is generated by the representation subsystem 118. In some instances, the user interface 123 displays one or more user interface 123 objects for rotating the displayed 3D representation 103 between each of a plurality of viewing angles. For example, responsive to receiving a selection of a user interface 123 object, the rendering subsystem 119 rotates or otherwise moves the displayed 3D representation 103 from a first viewing angle to a second viewing angle.

As depicted in FIG. 1, the modeling system 110 can receive a 2D input image 101 depicting an object from the user computing device 120 and generate a 3D representation 103 of the object based on the 2D input image 101 and a 3D object model 102. In some instances, the 2D input image 101 is captured by the camera component 122 of the user computing device 120. The modeling system 110 can apply a 3D representation model 115 to the 2D input image 101 to generate the 3D representation 103. FIG. 2 illustrates a method to apply a 3D representation model 115 to the 2D input image 101 to generate the 3D representation 103. Further details about the 3D representation generation model 115 are described in FIG. 3, FIG. 4, and FIG. 5.

The modeling system 110, including the representation subsystem 118 and the rendering subsystem 119, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of ordinary skill in the art would recognize many possible variations, alternatives, and modifications. For example, in some implementations, the modeling system 110 can be implemented using more or fewer systems or subsystems than those shown in FIG. 1, may combine two or more subsystems, or may have a different configuration or arrangement of the systems or subsystems.

Examples of Computer-Implemented Operations for Using a 3D Representation Generation Model to Generate a 3D Representation of an Object from an 2D Input Image of Incompletely-Depicted Object In the embodiments described herein, the modeling system 110 can generate a 3D representation 103 of an object by applying 3D representation generation model 115 to a 2D input image 101. In some instances, in the 2D input image 101, the object is incompletely depicted. For example, the object is occluded in a region of the object by another object depicted in the 3D input image 101 and therefore the 2D input image 101 does not include pixel data describing the region of the object. In another example, a region of the object is outside the camera view depicted in the 2D input image 101 and therefore the 2D input image 101 does not have pixel data representing the region. The 3D representation 103 of the object can be viewed from a plurality of viewing angles.

FIG. 2 depicts an example of a method for applying a 3D representation generation model 115 to a 2D input image 101 of an incompletely-depicted object to generate a 3D representation 103 of the object, according to certain embodiments disclosed herein. One or more computing devices (e.g., the modeling system 110 or the individual subsystems contained therein) implement operations depicted in FIG. 2. For illustrative purposes, the method 200 is described with reference to certain examples depicted in the figures. Other implementations, however, are possible.

In certain embodiments described herein, the image editing system 110 is a component of the user computing device 120 and the operations described herein as performed by the modeling system 110 (or one or more of the subsystems 118 and 119 thereof) are performed by the modeling application 121 of the user computing device 120. However, in some embodiments, the modeling system 110 is separate from the user computing device 120 and communicates with the user computing device 120 via the network 130. In some embodiments, the modeling system 110 is separate from the user computing device 120 but one or more operations described herein as performed by the modeling system 110 (or one or more subsystems 118 or 119 thereof) are performed by the modeling application 121 of the user computing device 120.

Figure 6:
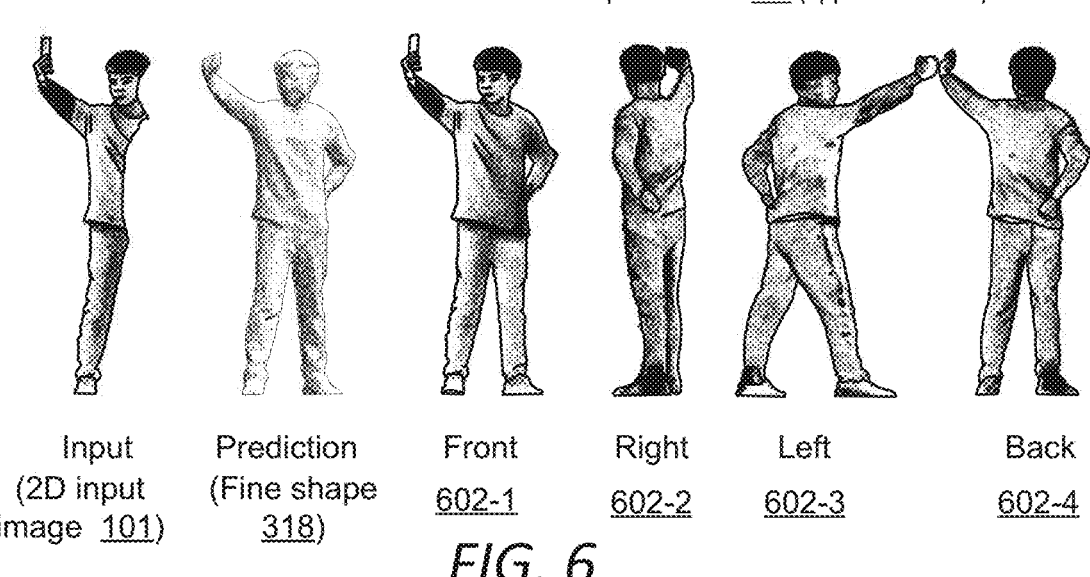
FIG. 6 illustrates an example 3D representation generated using the 3D representation generation model of FIG. 3, according to certain embodiments described herein.

At block 210, the method 200 involves accessing a two-dimensional (2D) input image 101 displayed via a user interface 123, the 2D input image 101 depicting, at a first viewing angle, a first object having at least one region that is not represented by pixel values of the 2D input image 101. In an example, a user of the user computing device 120 captures the 2D input image 101 using the user computing device 120. In this example, the user accesses a modeling application 121, selects the 2D input image 101, and the 2D input image 101 is displayed on the user interface 123 of the user computing device. The 2D input image 101 includes an incomplete depiction of an object. For example, the object is a human being. In some instances, the viewing angle is a frontal view, a side view, a rear view, a top-down view, or other view of the object captured in the 2D input image 101. The depiction of the object in the 2D input image 101 is incomplete because the 2D input image 101 does not comprise pixel data that encompasses an entirety of the object as viewed in the 2D input image 101. For example, pixel data can include red-green-blue (RGB) color values, grayscale color values, or other values associated with pixels of the 2D input image. For example, the 2D input image 101 comprises a set of pixels. In some instances, the pixel data does not encompass the entirety of the depicted object because part of the object is occluded by another object. In this example, although there are pixels that encompass the occluded area of the object, these pixel values describe the other object that is occluding the object and not the object itself. For example, the 2D input image 101 displayed on the user interface 123 depicts two people standing next to each other, where a first person is completely depicted in the 2D input image 101 but blocks a view of a portion (e.g., an arm) of a second person that is thus incompletely-depicted in the 2D input image 101. In some instances, the pixel data does not represent an entirety of the area in the 2D input image 101 that includes the depicted object because part of the object is not within the camera field of view captured in the 2D input image 101. For example, the 2D input image 101 displayed on the user interface 123 depicts a person, but a right arm of the person is outside of the camera field of view and is therefore not depicted in the 2D input image 101 and therefore the 2D input image 101 does not include pixel data that represents the right arm. FIG. 6 illustrates an example of a portion of a 2D input image 101 (see portion of input image 601 of FIG. 6) representing an incompletely-depicted object.

At block 220, the method 200 involves applying, by the representation subsystem 118, a three-dimensional (3D) representation generation model 115 to the 2D input image 101 to generate a 3D representation 103 of the first object that depicts an entirety of the first object. The input to the representation generation model 115 is the 2D input image 101 that partially depicts an object and the output of the representation generation model 115 is a 3D representation 103 of an entirety of the object. In this example, the 3D representation 103 includes no missing regions and the originally occluded/missing region which was missing in the 2D input image 101 is viewable in the 3D representation 103 at the first viewing angle. The representation generation model 115 includes a 3D convolutional neural network that determines generative volumetric features by learning to reconstruct a coarse yet complete 3D object (e.g., human object or other object) geometry with a 3D discriminator. Also, the representation generation model 115 improves high-frequency details of the coarse geometry by generating fine-detailed surface normals from multiviews and combining them through an implicit fusion network. Further, the representation generation model 115 performs view-progressive 3D appearance inpainting to obtain a fully textured and coherent 3D representation 103. Further details describing the 3D representation generation model 115 are provided in FIG. 3, FIG. 4, and FIG. 5 herein.

At block 230, the method 200 involves displaying, via a user interface 123, the 3D representation 103, wherein the 3D representation 103 is viewable via the user interface 123 from a plurality of viewing angles including the first viewing angle. For example, the rendering subsystem 119 displays the 3D representation 103 of the object via the user interface 123. For example, responsive to receiving the request to generate the 3D representation 103 from the 2D input image 101, the rendering subsystem 119 displays the 3D representation 103 via the user interface 123. Continuing with the example of the 2D input image 101 of the two people, where the first person partially occludes the second person, the rendering subsystem 119 displays the 3D representation 103 of the second person, which depicts an entirety of the second person and is viewable from a plurality of viewing angles. The 3D representation 103 of the object is viewable from a plurality of camera views. For example, the 3D representation 103 is a 3D model that can be rotated and viewed from multiple viewing angles in response to user input and/or automatically. In some instances, the multiple viewing angles include a frontal view, one or more side views, a rear view, a top-down view, or other view of the object captured in the 2D input image 101. The 3D representation 103 can be viewed from the multiple viewing angles and from any of the multiple viewing angles including the first viewing angle. For example, the 3D representation 103 could be displayed at a 0 degree angle (frontal view) and rotated any number of degrees up to 360 degrees along an axis (e.g., an x-axis) so that the 3D representation 103 can be viewed from multiple perspectives. In some instances, the 3D representation 103 can be rotated any number degrees with respect to one or more axes (e.g., one or more of an x-axis, a y-axis, or a z-axis).

FIG. 3 depicts a 3D representation generation model, according to certain embodiments disclosed herein. As depicted in FIG. 3, the inputs to the model include a 2D input image (I) 101 that incompletely depicts an object and a guiding 3D pose (P) 301. In the example of FIG. 3, the object depicted in the 2D input image 101 is a person and the 2D input image 101 incompletely depicts the person because it does not include pixel data for regions of the legs and an arm of the depicted person. The 3D pose 103 is associated with an object type. For example, the 3D pose 103 in the example of FIG. 3 is of a human body because the depicted object is a person. However, poses from other guiding models can be used for other object types (e.g., animals, plants, manmade objects, or other object types). The 3D representation generation model 115 reconstructs a complete fine shape (Gf) 318 in a coarse-to-fine manner. The representation generation model 115 generates a volume of image features (F) 303 by extracting the 2D input image 101 features and copying them in a depth direction. The representation generation model 115 concatenates the image feature volume 303 with the 3D pose 301 recorded on the volume (e.g., shown by step 304). The representation generation model 115 includes a 3D CNN (G3d) 305 that generates complete and coherent volumetric features 306 whose generative power is enabled by jointly learning with a 3D discriminator (D3d) 309 with explicit shape prediction (S3d) 307. The coarse MLP I 311 produces a coarse yet complete occupancy 313 of continually sampled 3D points and their intermediate global features $$(F_X^+)$$

312 where a 3D surface (coarse shape 314) is reconstructed using 0.5 level-set marching cubes. A fine MLP (Cf) 317 combines the intermediate global features 312 and surface normals enhanced from multiviews (multiview normal fusion framework 316) to output a fine-grained occupancy (fine shape 318). Finally, the representation generation model 115 completes an appearance (T) 320 by performing view-progressive texture inpainting 319.

In the representation generation model 115 described herein, the single-view 3D reconstruction is modeled as a binary feature classification of a 3D point:

$$F = \mathcal{E}(I), \mathcal{C}\left(F_{x_p}; X_p\right) \rightarrow [0, 1] \tag{1}$$

where $I \in \mathbb{I}^{w \times h \times 3}$ is the 2D input image 101 having an incomplete depiction of an object, $\varepsilon$ is the feature extraction function enabled by an encoder-decoder network 302, $F \in \mathbb{R}^{w \times h \times c}$ is a 2D map of image features, $\mathcal{C}$ is an implicit classifier which classifies a continually sampled 3D point $X \in \mathbb{R}^3$ into 0 (inside) and 1 (outside), so that the 3D surface can be represented as a 0.5 level-set of continuous 3D occupancy field. $x \in \mathbb{R}^3$ is the 2D projection of X, in other words, $\Pi X = x$ where $\Pi$ is the projection matrix, $p \in P$ is the index of points set on the visible object (e.g., body) parts. For pixels lying on invisible object parts $x_q$ where $q \in Q$ is the index of the invisible points set, $\mathcal{C}$ always classifies the features as outside the surface, $(F_{x_p}; X_p)=1$, due to the missing data in the image. In other words, no pixel information (e.g., black patches) exist to encode onto the image features for the invisible object parts.

The 3D representation generation model 115 augments incomplete image features by propagating features from visible to invisible (non-depicted) object parts with a joint learning of a 2D shape discriminator for generative adversarial training:

$$\mathcal{G}(F)=F^g, \ \mathcal{S}(F^g)=S, \ \mathcal{D}(S) \rightarrow [0,1] \tag{2}$$

where $\mathcal{G}$ is a generative function that generates complete features $F^g$, $\mathcal{S}$ is a function that predicts 2D binary shape mask $S \in [0,1]^{w \times h}$, where 0 represents a background and 1 represents a foreground. In Equation (2), $\mathcal{D}$ represents a 2D discriminator that distinguishes a real and a fake of a complete object (e.g., human) shape. Using a generative framework, the augmented image features allow the classifier $\mathcal{C}$ to classify the 3D points on the invisible object parts in a way that constructs a complete object, i.e., $\mathcal{C}$ $$\left(F_{x_q}^g; X_q\right) \rightarrow [0, 1].$$

Although the augmented image features a'e complete, the augmentId image featuInclude significant pose ambiguity such that any plausible object poses for invisible parts that harmonize with visible parts can be possible. Therefore, the 3D representation generation model 115 disambiguates the pose ambiguity by conditioning pose information as follows:

$$\mathcal{G}(F; P) = F^g, \ \mathcal{S}(F^g) = S, \ \mathcal{D}(S; P) \rightarrow [0, 1] \tag{3}$$

where $P \in \mathbb{R}^{w \times h \times m}$ represents a map of a guiding 2D object pose. Example guiding poses include keypoints and dense-pose models. Conditioning P enables features to be aware of global object poses, leading to shape generation without pose ambiguity.

Because the augmented features $F^g$ are modeled completely from 2D space, capturing the global ordinal relationship of an object in 3D is not possible. For example, for a human body object, the generated 3D surface of a leg may look plausible but its combination with a visible torso part of the human body is distorted. To capture such a global ordinal relationship, the 3D representation generation model 115 upgrades the featuring modeling pipeline from 2D to 3D as follows:

$$\mathcal{G}_{3d}(F; P_{3d}) = F_{3d}^g, \mathcal{C}(F_{3d}^g, X; X) \to [0, 1], \tag{4}$$

$$\mathcal{S}_{3d}(F_{3d}^g) = S_{3d}, \mathcal{D}_{3d}(\mathcal{S}_{3d}; P_{3d}) \to [0, 1],$$

where $S_{3d}$, $P_{3d}$, and $$F_{3d}^g$$

are defined in a canonical volume space. The generation of the volumetric features $$F_{3d}^g$$

allows $\mathcal{C}$ to reconstruct the globally coherent and complete 3D object geometry. In some instances, the 3D representation generation model 115 learns $$F_{3d}^g$$

by minimizing the following objectives:

$$L_{feat} = \mathcal{L}_c + \lambda_g \mathcal{L}_g + \lambda_{cGAN} \mathcal{L}_{cGAN} \tag{5}$$

where $\lambda$ balances a contribution of each loss, $\mathcal{L}_c$ makes a direct supervision on an implicit classifier:

$$\mathcal{L}_c = \sum_i \left\| \mathcal{C}\left(F_{3d,x}^g; X\right) - \mathcal{C}_{gt}(X) \right\| \tag{6}$$

where $\mathcal{C}_{gt}: \mathbb{R}^3 \to \{0,1\}$ outputs a ground-truth label of the 3D occupancy. $\mathcal{L}_g$ supervises the 3D shape prediction by comparing with ground truth volume, $\mathcal{L}_g = \Sigma \|(S_{3d} - S_{3d,gt})\|$. $\lambda_{cGAN}$ represents a conditional adversarial loss, where $\{S_{3d}, P_{3d}\}$ is used for fake inputs and $\{S_{3d,gt}, P_{3d}\}$ for real inputs.

In certain embodiments, as depicted in FIG. 3, the 3D representation generation model 115 comprises a features extraction function with a 2D convolutional neural network 302 (e.g., a U-Net), which produces pixel-aligned features (e.g., F, image feature 303) from a 2D input image (I) 101. The 3D representation generation model 115 (e.g., a 3D U-Net) designs a 3D CNN ($\mathcal{G}_{3d}$) 305 that generates 3D volumetric features $$(F_{3d}^g)$$

306 from a 3D object pose (P) 301 and image features (F) 303. In some instances, to build the input volumes for the 3D CNN ($\mathcal{G}_{3d}$) 305, the 3D representation generation model 115 discretizes vertices of an object model (e.g., SMPL body model) and records them on a canonical volume (e.g., 128×128×128). The 3D representation generation model 115 copies the image features (F) 303 over the three-dimensional direction and concatenates the two volumes and for the 3D pose (P) 301 and the image features (F) 303. The 3D representation generation model 115 decodes volumetric features, via explicit decoding $\mathcal{C}_{3d}$ (e.g., shape prediction 307), by using 3D convolutional networks to reconstruct a complete explicit occupancy ($S_{3d}$) 308 at each voxel grid, whose geometric distribution are classified by a 3D discriminator ($\mathcal{D}_{3d}$) 309. The 3D representation generation model 115 decodes volumetric features, via implicit decoding $\mathcal{C}$, by using a coarse multilayer perceptron (MLP) 311 to classify the learned volumetric features (e.g., generative volume feature 306) of a 3D query point X (e.g., Query X in FIG. 3) and performing trilinear interpolation of the volumetric features that are neighboring the query point to construct a continuous features representations. The 3D query point X is the resultant of dynamic sampling around a ground truth mesh. Further, $\mathcal{C}$ performed by the coarse MLP 311 produces not only occupancy 313 but also its intermediate feature representation $$(F_X^*)$$

312 as follows:

$$\mathcal{C}\left(F_{3d,x}^g; X\right) \to \{[0, 1], F_x^*\} \tag{7}$$

where $$F_x^*$$

$\in \mathbb{R}^{256}$ is an intermediate feature that captures a structure and visibility of the 3D point in the context of the global object pose.

The 3D representation generation model 115 improves the quality of local geometric details of the coarse reconstruction from volumetric features by combining fine-detailed surface normals in multiview normal fusion framework 316:

$$F^n = \mathcal{E}^n\left(N^f\right), \mathcal{C}^f(F_x^n; F_X^*, X) \to [0, 1] \tag{8}$$

where $N^f$ is the surface normal map with high-frequency details, $\varepsilon^n$ is a surface normal encoder that produces pixel-aligned normal features, $\mathcal{C}^f$ is the fine classifier (e.g., fine MLP 317) that classifies the in/out occupancy 313 status of the 3D point X, and F* is the intermediate features 312 of the coarse classifier ($\mathcal{C}$—coarse MLP 311). To obtain the surface normal map with high frequency details, $N^f$, the surface normal detection problem is reformulated as:

$$\mathcal{R}\left(G^c; v_i\right) = N_{v_i}^c, N_{v_i}^f = \mathcal{G}^n\left(N_{v_i}^c; I\right) \tag{9}$$

where $\mathcal{R}$ is a function that renders the surface normals from the coarse geometry $G^c \in \mathbb{R}^{n \times 3}$ (coarse shape 314 obtained based on outputs of the coarse MLP 311) and a specific viewpoint $\upsilon_i$. Further in Equation (9), $g$ is a generation function that generates high-frequency normal details from $$N_{\upsilon_i}^c$$

and the input partial image I (e.g., 2D input image 101) is used to guide the appearance style of the object in the latent space. The coarse geometry $G^c$ (e.g., coarse shape 314) is complete and renders the coarse surface normal from any view, which enables features of fine surface normals from multiviews to be combined as follows:

$$C^f(\{F_{\upsilon_i,I}^n, \ldots F_{\upsilon_i,x_i}^n\}; F_X^*) \to [0, 1] \tag{10}$$

where $F^f$ is the outcome of the feature extraction of Equation (8) and i is the number of views. In certain examples i=4 (four views), however any predefined number of views may be used, for example, two views, six views, ten views, or other predefined number of views. In certain examples in which four views are used, the four views comprise a front view, a back view, a right side view, and a left side view. The 3D representation generation model 115 enables the encoder-decoder network ($\varepsilon^n$) and the surface normal fusion ($C^f$) using multiview fusion networks and determines $g^n$ using normal enhancement networks. Further details about the multiview normal surface fusion pipeline 316 in the 3D representation generation model 115 are provided in FIG. 4 and further details about the surface normal enhancement framework 315 are provided in FIG. 5.

Given a complete geometry and partial input image that incompletely depicts an object (e.g., 2D input image 101), the 3D representation generation model 115 generates a full texture (e.g., fine shape 318) of the object by synthesizing the image from many viewpoints in a progressive way, including iterating a surface rendering, texture inpainting, and 3D warping to other views. By starting from the input view, for each view, the 3D representation generation model 115 renders the fine surface normal using the reconstructed geometry (e.g., fine shape 318). In a progressive texture inpainting 319 component of the 3D representation generation model 115, an object inpainting network generates a complete object image by taking as input the 2D input image 101 and the surface normal $N^f$ as shape guidance. The 3D representation generation model 115 warps the generated texture to other views that are close to the current view through the 3D geometry (e.g., fine shape 318) by combining the textures in in 3D and projecting them to other views. This enables rendering of a partial object image from other views in a geometrically plausible way. The three steps of surface rendering, texture inpainting, and 3D warping are iterated to obtain a full texture in 3D (e.g., appearance 320), as also illustrated in FIG. 6. The full texture appearance 320 is rendered as the 3D representation 103 of the object.

FIG. 4 depicts a multiview normal surface fusion pipeline 316 of the 3D representation generation model 115 of FIG. 3, according to certain embodiments described herein. An encoder-decoder network 302 ($\varepsilon^n$) extracts the pixel-aligned features from the fine surface normal $N^f$ at each view. FIG. 4 illustrates four views (402-1, 402-2, 402-3, 402-i, where i=4) but any predefined number (i) of views may be used. The surface normal fusion function of Equation (10), $C^f$, is enabled using a multilayer perceptron (MLP), fine MLP 317. For each dynamically sampled 3D point X, the fine MLP 317 receives, as input, surface normal features from multiviews and global intermediate features $$F_X^* \text{312}$$

Fdetermined by the coarse MLP 311 and outputs fine-grained occupancy (e.g., fine shape 318) which captures image features and viewpoints in the context of a global geometry. In some instances, the multiview normal surface fusion pipeline 316 reconstructs the fine geometry $G^f$ (e.g., fine shape 318) by applying a 0.5 level-set marching cube algorithm. In some instances, the encoder-decoder network 302 ($\varepsilon^n$) and the fine MLP 317 ($C^f$) is trained by minimizing a loss function as follows:

$$\mathcal{L}_{fusion} = \sum_i \left\| C^f(\{F_{I,x_1}^n, \ldots F_{\upsilon_i,x_i}^n\}; F_X^*) - C_{gt}(X) \right\|$$

where $$C^f(\{F_{I,x_1}^n, \ldots F_{\upsilon_i,x_i}^n\}; F_X^*)$$

corresponds to Equation (10) and $C_{gt}(X)$ represents a ground truth value.

FIG. 5 depicts a surface normal enhancement framework 315 of the 3D representation generation model of FIG. 3, according to certain embodiments described herein. The surface normal enhancement framework 315 enables $g^n$. In some instances, the input to the surface normal enhancement framework 315 is a coarse surface normal $N^c$ 402, a surface normal of a 3D object model (e.g., 3D pose 301 of SMPL human body model) $N^p$ 401, and the 2D input image 101 (I). The surface normal of the 3D object model $N^p$ 401 guides the global object pose, and an encoder 403 encodes the 2D input image (I) 101 to extract style features from latent space. For the input view, the surface normal enhancement framework 315 concatenates the 2D input image 101 (I) (otherwise, black image) for other surface normal maps {$N^c$, $N^p$} to allow the network G 404 to preserve local patterns from visible texture. $g^n$ (network 404) is trained, in some instances, by minimizing the following loss function:

$$L_{enhance} = \mathcal{L}_1 + \lambda_{vgg}\mathcal{L}_{vgg} + \lambda_{Adv}\mathcal{L}_{Adv} \tag{11}$$

where $\lambda$ controls a weight of each loss. $\mathcal{L}_1$ measures a difference between the predicted fine surface normal $N^f$ and a ground truth surface normal $$N_{gt}^f, \mathcal{L}_1 = \left\| N^f - N_{gt}^f \right\|$$

where $$N_{gt}^f$$

is rendered from the ground truth geometry. The weight $\lambda_{vgg}$ penalizes a difference of $N^f$ and $$N_{gt}^f$$

from their VGG features space to capture both high-frequency details and semantic validity. The weight $\lambda_{Adv}$ is for an unconditional adversarial loss $\mathcal{L}_{Adv}$ to evaluate a plausibility of a surface normal where $$N_{gt}^f$$

is real and $N^f$ is fake (e.g., represented as real/fake 407 in FIG. 4) and applying a patch discriminator.

FIG. 6 illustrates an example 3D representation 103 generated using the 3D representation generation model of FIG. 3, according to certain embodiments described herein. Specifically, the 3D representation 103 of FIG. 6 illustrates an output (e.g., appearance 320) of the progressive texture inpainting pipeline 319 shown in the 3D representation generation model 115 of FIG. 3, which is based on a fine shape 318 predicted by fine MLP 317. As shown in FIG. 6, the generated 3D representation can be viewed from a plurality of views (e.g., views 602-1, 602-2, 602-3, 602-4 representing front, back, left, and right views respectively) and do not include any missing object data like the missing pixels of the 2D input image 101 (the missing leg, arm, and partial torso).

Figure 7:
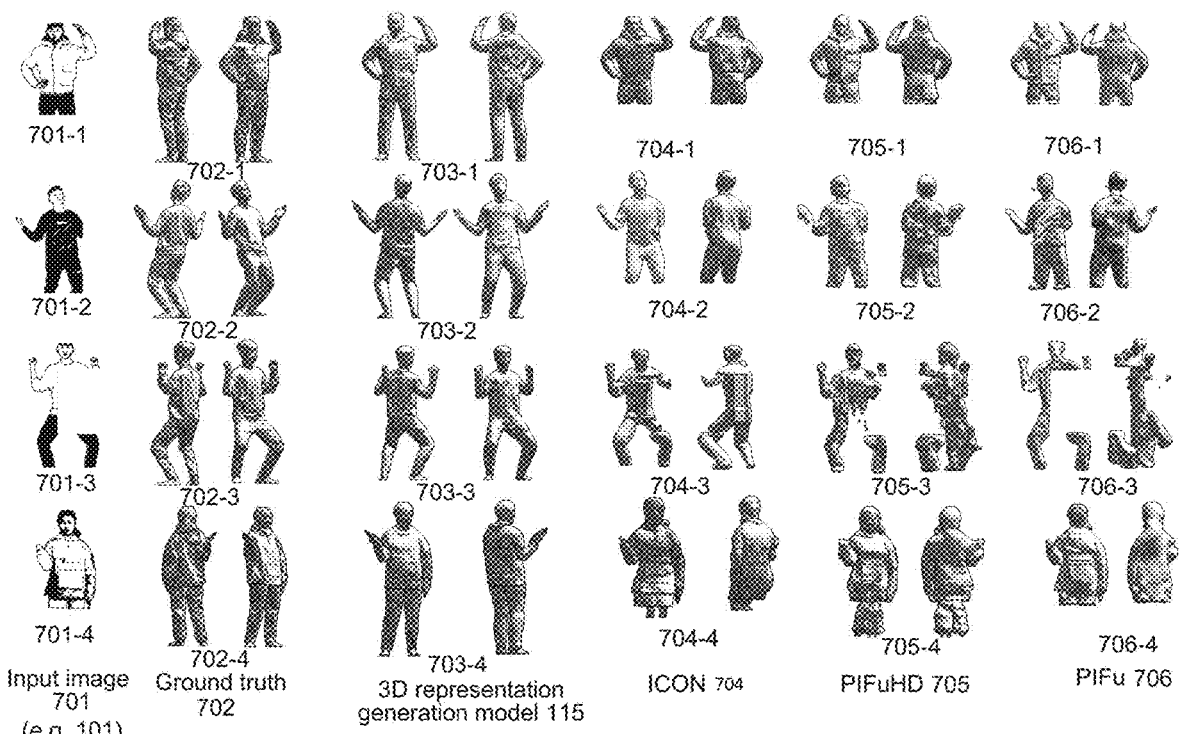
FIG. 7 illustrates example 3D representations generated using the 3D representation generation model described herein compared to conventionally generated 3D representations, according to certain embodiments described herein.

FIG. 7 illustrates example 3D representations 103 generated using the 3D representation generation model described herein compared to conventionally generated 3D representations, according to certain embodiments described herein. FIG. 7 shows a comparison of geometries of 3D representations 103 generated by the 3D representation generation model 115 described herein against conventional ICON 704, PIFuHD 705, and PIFu 706 models and against a ground truth 702. For example, FIG. 7 illustrates, for input 2D image 701-1, a ground truth 702-1 geometry, a fine geometry 703-1 generated by the 3D representation model 115, a geometry 704-1 generated by the conventional ICON 704 model, a geometry 705-1 generated by the conventional PIFuHD 705 model, and a geometry 706-1 generated by the conventional PIFu model 706. FIG. 7 also illustrates, for input 2D image 701-2, a ground truth 702-2 geometry, a fine geometry 703-2 generated by the 3D representation model 115, a geometry 704-2 generated by the conventional ICON 704 model, a geometry 705-2 generated by the conventional PIFuHD 705 model, and a geometry 706-2 generated by the conventional PIFu model 706. FIG. 7 also illustrates, for input 2D image 701-3, a ground truth 702-3 geometry, a fine geometry 703-3 generated by the 3D representation model 115, a geometry 704-3 generated by the conventional ICON 704 model, a geometry 705-3 generated by the conventional PIFuHD 705 model, and a geometry 706-3 generated by the conventional PIFu model 706. Further, FIG. 7 also illustrates, for input 2D image 701-4, a ground truth 702-4 geometry, a fine geometry 703-4 generated by the 3D representation model 115, a geometry 704-4 generated by the conventional ICON 704 model, a geometry 705-4 generated by the conventional PIFuHD 705 model, and a geometry 706-4 generated by the conventional PIFu model 706. As illustrated in FIG. 7, each of the input 2D images 701-1, 701-2, 701-3, and 701-4 incompletely depict a respective human body object because pixel data of one or more parts of the human body are missing. As shown in geometries generated for the ICON 704, PiFuHD 705, and PIFu 706 models include missing data in their fine geometries while the fine geometries 703-1, 703-2, 703-3, and 703-4 include a complete geometry including parts of the human body object associated with the missing pixel data of their respective input images 701-1, 701-2, 701-3, and 701-4.

Examples of Computing Environments for Implementing Certain Embodiments

Figure 8:
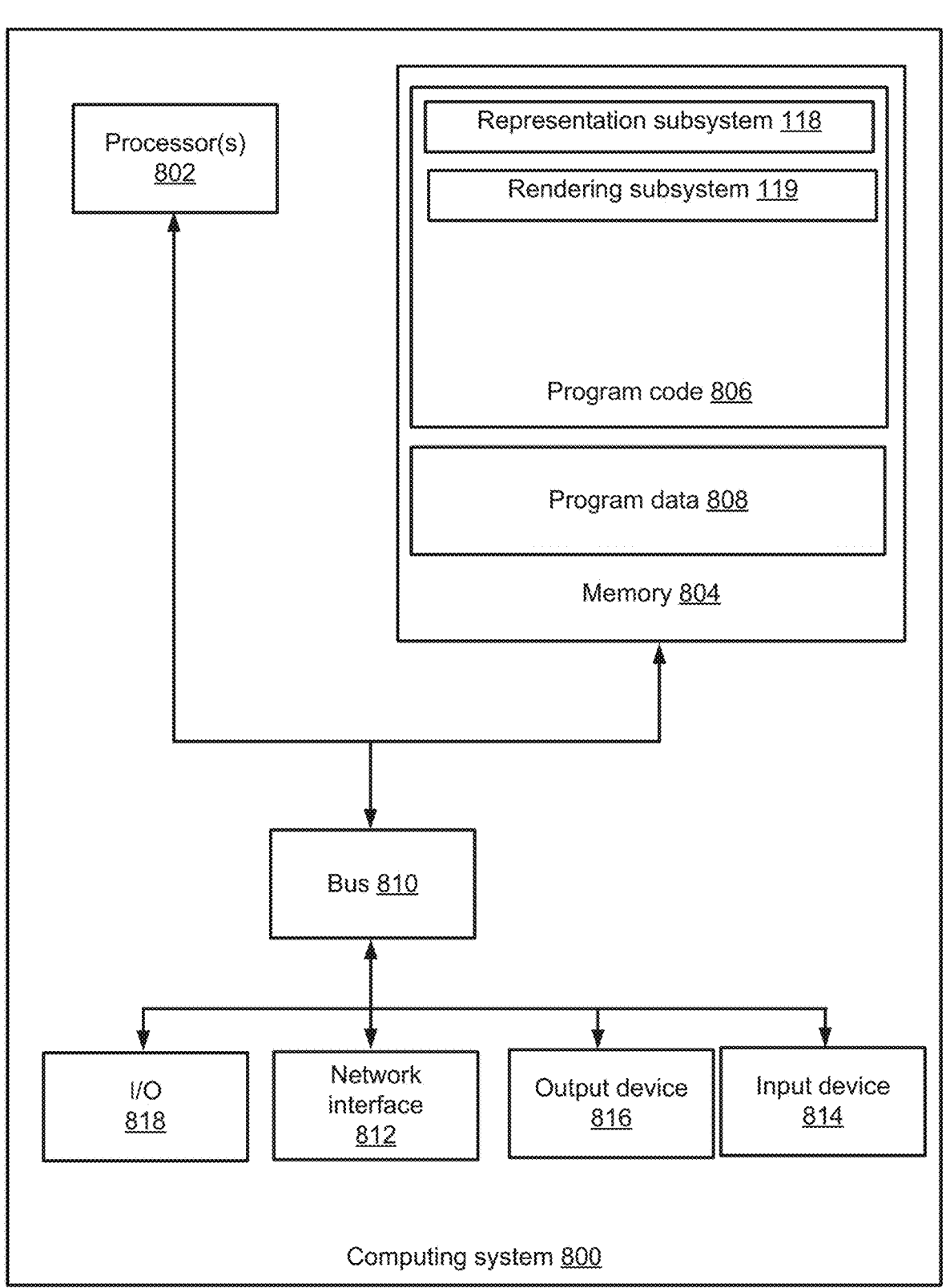
FIG. 8 depicts an example of a computing system that performs certain operations described herein, according to certain embodiments disclosed herein.

Any suitable computer system or group of computer systems can be used for performing the operations described herein. For example, FIG. 8 depicts an example of a computer system 800. The depicted example of the computer system 800 includes a processing device 802 communicatively coupled to one or more memory components 804. The processing device 802 executes computer-executable program code stored in a memory component 804, accesses information stored in the memory component 804, or both. Execution of the computer-executable program code causes the processing device to perform the operations described herein. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory components 804 includes any suitable non-transitory computer-readable medium for storing program code 806, program data 808, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 804 can be volatile memory, non-volatile memory, or a combination thereof.

The computer system 800 executes program code 806 that configures the processing device 802 to perform one or more of the operations described herein. Examples of the program code 806 include, in various embodiments, the modeling system 110 (including the representation subsystem 118 and the rendering subsystem 119) of FIG. 1, which may include any other suitable systems or subsystems that perform one or more operations described herein (e.g., one or more neural networks, encoders, attention propagation subsystem and segmentation subsystem). The program code 806 may be resident in the memory components 804 or any suitable computer-readable medium and may be executed by the processing device 802 or any other suitable processor.

The processing device 802 is an integrated circuit device that can execute the program code 806. The program code 806 can be for executing an operating system, an application system or subsystem, or both. When executed by the processing device 802, the instructions cause the processing device 802 to perform operations of the program code 806.

When being executed by the processing device 802, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 804 store the program data 808 that includes one or more datasets described herein. In some embodiments, one or more of data sets are stored in the same memory component (e.g., one of the memory components 804). In additional or alternative embodiments, one or more of the programs, data sets, models, and functions described herein are stored in different memory components 804 accessible via a data network. One or more buses 810 are also included in the computer system 800. The buses 810 communicatively couple one or more components of a respective one of the computer system 800.

In some embodiments, the computer system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computer system 800 is able to communicate with one or more other computing devices via a data network using the network interface device 812.

The computer system 800 may also include a number of external or internal devices, an input device 814, a presentation device 816, or other input or output devices. For example, the computer system 800 is shown with one or more input/output ("I/O") interfaces 818. An I/O interface 818 can receive input from input devices or provide output to output devices. An input device 814 can include any device or group of devices suitable for receiving visual, auditory, or other suitable input that controls or affects the operations of the processing device 802. Non-limiting examples of the input device 814 include a touchscreen, a mouse, a keyboard, a microphone, a separate mobile computing device, etc. A presentation device 816 can include any device or group of devices suitable for providing visual, auditory, or other suitable sensory output. Non-limiting examples of the presentation device 816 include a touch-screen, a monitor, a speaker, a separate mobile computing device, etc.

Although FIG. 8 depicts the input device 814 and the presentation device 816 as being local to the computer system 800, other implementations are possible. For instance, in some embodiments, one or more of the input device 814 and the presentation device 816 can include a remote client-computing device that communicates with computing system 800 via the network interface device 812 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions.

Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
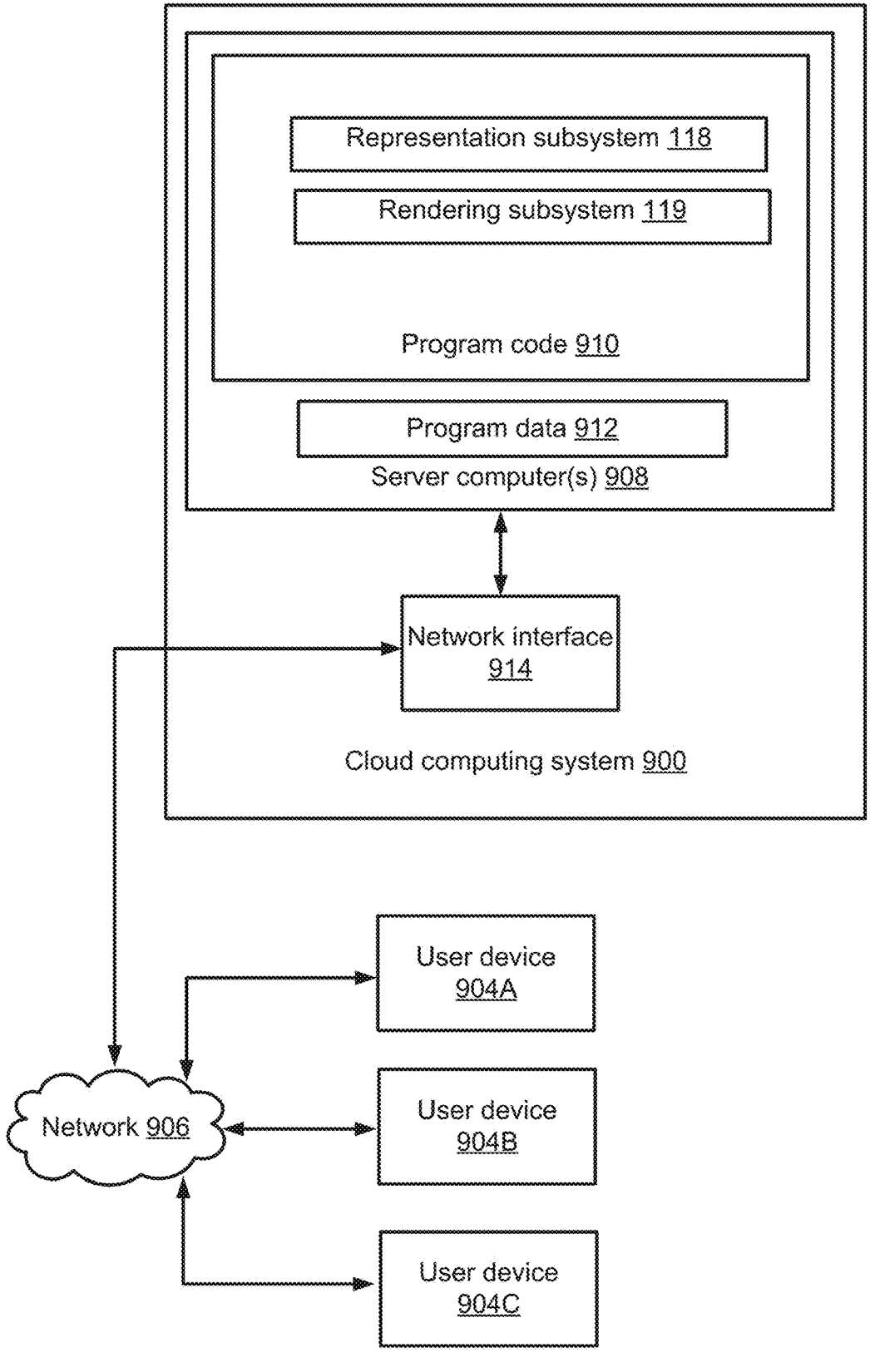
FIG. 9 depicts an example of a cloud computing system that performs certain operations described herein, according to certain embodiments disclosed herein.

In some embodiments, the functionality provided by computer system 800 may be offered as cloud services by a cloud service provider. For example, FIG. 9 depicts an example of a cloud computer system 900 offering a service for generating a 3D representation 103 of an object based on a 2D input image 101 that incompletely depicts the object. The cloud computer system 900 performs the processing to provide the service of generating a 3D representation 103 of an object based on a 2D input image 101 that incompletely depicts the object. The cloud computer system 900 may include one or more remote server computers 908.

The remote server computers 908 include any suitable non-transitory computer-readable medium for storing program code 910 (e.g., the representation subsystem 118 and the rendering subsystem 119 of FIG. 1) and program data 912, or both, which is used by the cloud computer system 900 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and Action-Script. In various examples, the server computers 908 can include volatile memory, non-volatile memory, or a combination thereof.

One or more of the server computers 908 execute the program code 910 that configures one or more processing devices of the server computers 908 to perform one or more of the operations that generate a 3D representation 103 of an object based on a 2D input image 101 that incompletely depicts the object. As depicted in the embodiment in FIG. 9, the one or more servers providing the service for generating a 3D representation 103 of an object based on a 2D input image 101 that incompletely depicts the object may implement the representation subsystem 118 and the rendering subsystem 119. Any other suitable systems or subsystems that perform one or more operations described herein (e.g., one or more development systems for configuring an interactive user interface) can also be implemented by the cloud computer system 900.

In certain embodiments, the cloud computer system 900 may implement the services by executing program code and/or using program data 912, which may be resident in a memory component of the server computers 908 or any suitable computer-readable medium and may be executed by the processing devices of the server computers 908 or any other suitable processing device.

In some embodiments, the program data 912 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 906.

The cloud computer system 900 also includes a network interface device 914 that enable communications to and from cloud computer system 900. In certain embodiments, the network interface device 914 includes any device or group of devices suitable for establishing a wired or wireless data connection to the data networks 906. Non-limiting examples of the network interface device 914 include an Ethernet network adapter, a modem, and/or the like. The service for generating a 3D representation 103 of an object based on a 2D input image 101 that incompletely depicts the object is able to communicate with the user devices 904A, 904B, and 904C via the data network 906 using the network interface device 914.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. General Considerations Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a modeling system, comprising:

accessing a two-dimensional (2D) input image displayed via a user interface, the 2D input image depicting, at a first view, a first object, wherein at least one region of the first object is not represented by pixel values of the 2D input image;

training a three-dimensional (3D) convolutional neural network of a 3D representation generation model using a 3D discriminator to produce generative volumetric features in the at least one region of the first object in the 2D input image;

combining fine-detailed surface normals in a multiview normal fusion framework to produce multiview surface normals based on pixel-aligned normal features;

combining, using the 3D representation generation model applied to the 2D input image, the multiview surface normals of the first object with the generative volumetric features to produce a 3D representation of the first object that depicts an entirety of the first object including the at least one region; and displaying, via the user interface, the 3D representation, wherein the 3D representation is viewable via the user interface from a plurality of views including the first view.

2. The method of claim 1, wherein at the first view the at least one region is outside of an area of the 2D input image.

3. The method of claim 1, wherein at the first view the at least one region is occluded by a second object depicted in the 2D input image.

4. The method of claim 1, further comprising:

generating, based on the generative volumetric features determined based on the 2D input image, a coarse geometry for the first object using a coarse multilayer perceptron (MLP); and generating, based on the coarse geometry and intermediate features generated by the coarse MLP, a fine geometry for the first object.

5. The method of claim 4, wherein the multiview surface normals are based on the coarse geometry.

6. The method of claim 4, further comprising:

generating an image feature volume for the 2D input image by extracting features of the 2D input image in a depth direction; and determining concatenated image features by concatenating the image feature volume with a 3D pose of the first object recorded on the image feature volume, the 3D pose determined from a 3D object model.

7. The method of claim 4, further comprising applying, based on the fine geometry generated for the first object and the 2D input image, a progressive texture inpainting process to generate the 3D representation.

8. The method of claim 1, wherein the 3D representation is displayed at the first view and depicts the at least one region of the first object, and further comprising:

responsive to receiving an input via the user interface, displaying the 3D representation at a second view of the plurality of views that is different from the first view, wherein the 3D representation displayed at the second view depicts the at least one region of the first object.

9. A system comprising:

a memory component; and a processing device coupled to the memory component, the processing device configured to perform operations comprising:

accessing a two-dimensional (2D) input image displayed via a user interface, the 2D input image depicting, at a first view, a first object, wherein at least one region of the first object is not represented by pixel values of the 2D input image;

training a three-dimensional (3D) convolutional neural network of a 3D representation generation model using a 3D discriminator to produce generative volumetric features in the at least one region of the first object in the 2D input image;

combining fine-detailed surface normals in a multiview normal fusion framework to produce multiview surface normals based on pixel-aligned normal features;

combining, using the 3D representation generation model applied to the 2D input image, the multiview surface normals of the first object with the generative volumetric features to produce a 3D representation of the first object that depicts an entirety of the first object including the at least one region; and displaying, via the user interface, the 3D representation, wherein the 3D representation is viewable via the user interface from a plurality of views including the first view, wherein the 3D representation is displayed at the first view and depicts the at least one region of the first object.

10. The system of claim 9, the operations further comprising:

responsive to receiving an input via the user interface, displaying the 3D representation at a second view of the plurality of views that is different from the first view, wherein the 3D representation displayed at the second view depicts the at least one region of the first object.

11. The system of claim 9, wherein at the first view the at least one region is outside of an area of the 2D input image or is occluded by a second object depicted in the 2D input image.

12. The system of claim 9, the operations further comprising:

generating, based on the generative volumetric features determined based on the 2D input image, a coarse geometry for the first object using a coarse multilayer perceptron (MLP); and generating, based on the coarse geometry and intermediate features generated by the coarse MLP, a fine geometry for the first object.

13. The system of claim 12, wherein the multiview surface normals are based on the coarse geometry.

14. The system of claim 12, the operations further comprising:

generating an image feature volume for the 2D input image by extracting features of the 2D input image in a depth direction; and determining concatenated image features by concatenating the image feature volume with a 3D pose of the first object recorded on the image feature volume, the 3D pose determined from a 3D object model.

15. The system of claim 12, the operations further comprising applying, based on the fine geometry generated for the first object and the 2D input image, a progressive texture inpainting process to generate the 3D representation.

16. The system of claim 12, wherein the 3D representation is displayed at the first view and depicts the at least one region of the first object, the operations further comprising:

responsive to receiving an input via the user interface, displaying the 3D representation at a second view of the plurality of views that is different from the first view, wherein the 3D representation displayed at the second view depicts the at least one region of the first object.

17. A non-transitory computer-readable medium storing executable instructions, which when executed by a processing device, cause the processing device to perform operations comprising:

accessing a two-dimensional (2D) input image displayed via a user interface, the 2D input image depicting, at a first view, a first object, wherein at least one region of the first object is not represented by pixel values of the 2D input image, wherein the at least one region is outside of an area of the 2D input image or is occluded by a second object depicted in the 2D input image;

combining fine-detailed surface normals in a multiview normal fusion framework to produce multiview surface normals based on pixel-aligned normal features;

training a three-dimensional (3D) convolutional neural network of a 3D representation generation model using a 3D discriminator to produce generative volumetric features in the at least one region of the first object in the 2D input image;

combining, using the 3D representation generation model applied to the 2D input image, the multiview surface normals of the first object with the generative volumetric features to produce a 3D representation of the first object that depicts an entirety of the first object including the at least one region; and displaying, via the user interface, the 3D representation, wherein the 3D representation is viewable via the user interface from a plurality of views including the first view, wherein the 3D representation is displayed at the first view and depicts the at least one region of the first object.

18. The non-transitory computer-readable medium of claim 17, the operations further comprising:

generating, based on the generative volumetric features determined based on the 2D input image, a coarse geometry for the first object using a coarse multilayer perceptron (MLP);

generating, based on the coarse geometry and intermediate features generated by the coarse MLP, a fine geometry for the first object; and applying, based on the fine geometry generated for the first object and the 2D input image, a progressive texture inpainting process to generate the 3D representation.

19. The non-transitory computer-readable medium of claim 18, the operations further comprising:

generating an image feature volume for the 2D input image by extracting features of the 2D input image in a depth direction; and determining concatenated image features by concatenating the image feature volume with a 3D pose of the first object recorded on the image feature volume, the 3D pose determined from a 3D object model.

20. The system of claim 12, the operations further comprising:

responsive to receiving an input via the user interface, displaying the 3D representation at a second view of the plurality of views that is different from the first view, wherein the 3D representation displayed at the second view depicts the at least one region of the first object.

* * * * *